United States Patent [19]

Olsen

[11] 4,329,050

[45] May 11, 1982

[54] STRIP-FIELD SPECTRORADIOMETER

[75] Inventor: Arthur A. Olsen, Boulder, Colo.

[73] Assignee: Ball Corporation, Muncie, Ind.

[21] Appl. No.: 89,295

[22] Filed: Oct. 30, 1979

[51] Int. Cl.³ .......................... G01J 3/18; G01J 3/34
[52] U.S. Cl. .................................. 356/305; 356/328
[58] Field of Search ............ 356/302, 305, 308, 326, 356/328; 250/338, 339; 358/109, 212

[56] References Cited

U.S. PATENT DOCUMENTS 4,146,332  3/1979  Moore ............................... 356/308

OTHER PUBLICATIONS

Vasilev et al., *Soviet Journal of Optical Technology*, vol. 44, No. E., Feb. 1977, pp. 89–91.
Zaitzeff et al., *IEEE Transactions on Geoscience Electronics*, vol. GE-9, No. 3, Jul. 1971, pp. 114–120.
Bartoe et al., *Journal of the Optical Society of America*, vol. 65, No. 1, Jan. 1975, pp. 13–21.

*Primary Examiner*—F. L. Evans
*Attorney, Agent, or Firm*—Gilbert E. Alberding

[57]  ABSTRACT

A strip field telescopic spectroradiometer for gathering data along an entire narrow line of a two-dimensional field of view simultaneously. The optical axis of a concentric telescope is folded into the collimator axis of a concentric spectrograph by a spherical field mirror. The spectrograph includes an array of charge coupled devices as a detector at its final image surface.

26 Claims, 4 Drawing Figures

STRIP-FIELD SPECTRORADIOMETER

BACKGROUND OF THE INVENTION

This invention relates generally to spectroradiometry and specifically to telescopic spectroradiometry.

In monitoring a two-dimensional region of the earth from an aircraft or spaceship, such as a satellite, it is desirable to obtain an image of radiation from that region in at least two different spectral wavebands. Thus far, such spectral data has been gathered using primarily two different types of systems: photography and point-by-point scanning.

Photographic systems require the user to photograph the entire region utilizing an optical filter for a first spectral waveband and then to photograph the entire region again, this time using an optical filter for a second spectral waveband. Each time a photograph is taken, data for a single spectral waveband is gathered for the entire two-dimensional region simultaneously. In other words, data for a given waveband is gathered at one time for a wide field of view. After all photographs have been taken, they must be processed and then the data from each photograph must be correlated. Results are not available in real time, but rather require lengthy photographic processing and correlation of the information contained in the various finished photographs.

Scanning systems, on the other hand, build up an image from a scan of consecutive points and lines according to a predetermined scanning pattern. Light from the two-dimensional region being scanned is coupled through a small aperture to a spectroradiometer which analyzes the spectral content of radiation from the entire region on a point-by-point basis. The instantaneous field of view must be small because spectroradiometers require a small input aperture and because a large field of view results in a loss of spatial resolution. As the field of view scans the entire two-dimensional region point-by-point within each line of the region and line-by-line within the entire region, the spectroradiometer is continuously separating light incident from the scan into its spectral components.

Presently utilized scanning systems require elaborate mechanical mechanisms for the precise point-by-point scanning required. Such mechanisms require a great deal of attention for alignment, maintenance, etc.

Because each of these different types of remote sensing systems has operational limitations, it is desirable to have available an optical instrument for gathering two-dimensional spectral scene information that is compact, lightweight, has low power requirements, and requires minimal attention.

SHORT STATEMENT OF THE INVENTION

Therefore, there is provided a spectroradiometer for use in place of the presently used photographic techniques and for use in place of the presently used technique of scanning point-by-point with continuous spectral processing.

The strip-field spectroradiometer includes a concentric telescope and a modified Czerny-Turner spectrograph having their respective optical axes folded into one another by a spherical field mirror in the form of a strip. The spectrograph includes an array of charge coupled devices (CCDs) at its final image surface.

The telescope is concentric about an input aperture and has an optical axis. The spherical field mirror is in the form of a long narrow strip and folds the optical axis of the telescope into the optical axis of a collimator. Light gathered by the telescope and reflected by the collimator impinges upon and is diffracted by a grating to a camera mirror. This camera mirror reflects light from the grating onto the CCD array at the final image surface.

BRIEF DESCRIPTION OF THE DRAWINGS

Other objects, features and advantages of the present invention will become more readily apparent from the following detailed description of the preferred embodiment, the appended claims, and the accompanying drawings wherein:

DETAILED DESCRIPTION OF THE PREFERRED EMBODIMENT

Figure 1:
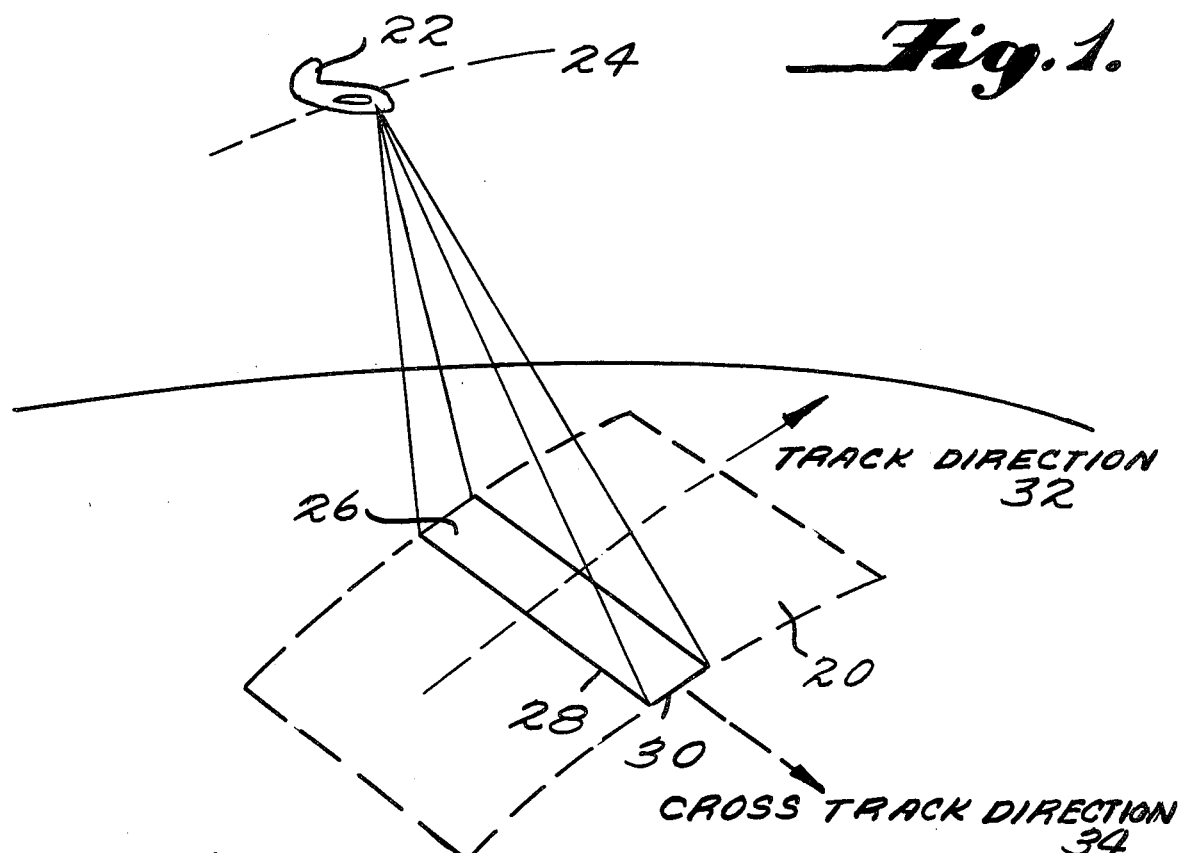
FIG. 1 is a pictorial representation of a two-dimensional region of the earth being scanned by an airborne strip field spectroradiometer according to the present invention.

Referring now to the figures, wherein like reference numerals designate like or corresponding parts throughout, FIG. 1 is a pictorial representation of a two-dimensional region 20 of the earth being scanned. The strip field spectroradiometer is carried on board an aircraft 22 having a flight direction as indicated by arrow 24. The strip-field spectroradiometer defines a field of view 26 having length 28 and width 30. Field of view 26 moves in a track direction 32 corresponding to flight direction 24 and a cross-track direction 34 is defined as being orthogonal to the track direction. The field of view 26 is a long, narrow, essentially one-dimensional field of view (i.e. length 28 is very large compared to width 30 even though FIG. 1 exaggerates width 30 for clarity).

The strip-field spectroradiometer according to the present invention, is an optical system for the simultaneous collection of spectral data along field of view 26. The optical axis of a conventional telescope is folded into the optical axis of a modified Czerny-Turner spectrograph by a spherical field mirror in the form of a narrow strip. This field mirror defines field of view 26 presented to the spectrograph.

The spectrograph has a two-dimensional array of charge coupled devices (CCDs) positioned at its final image surface.

Figure 2:
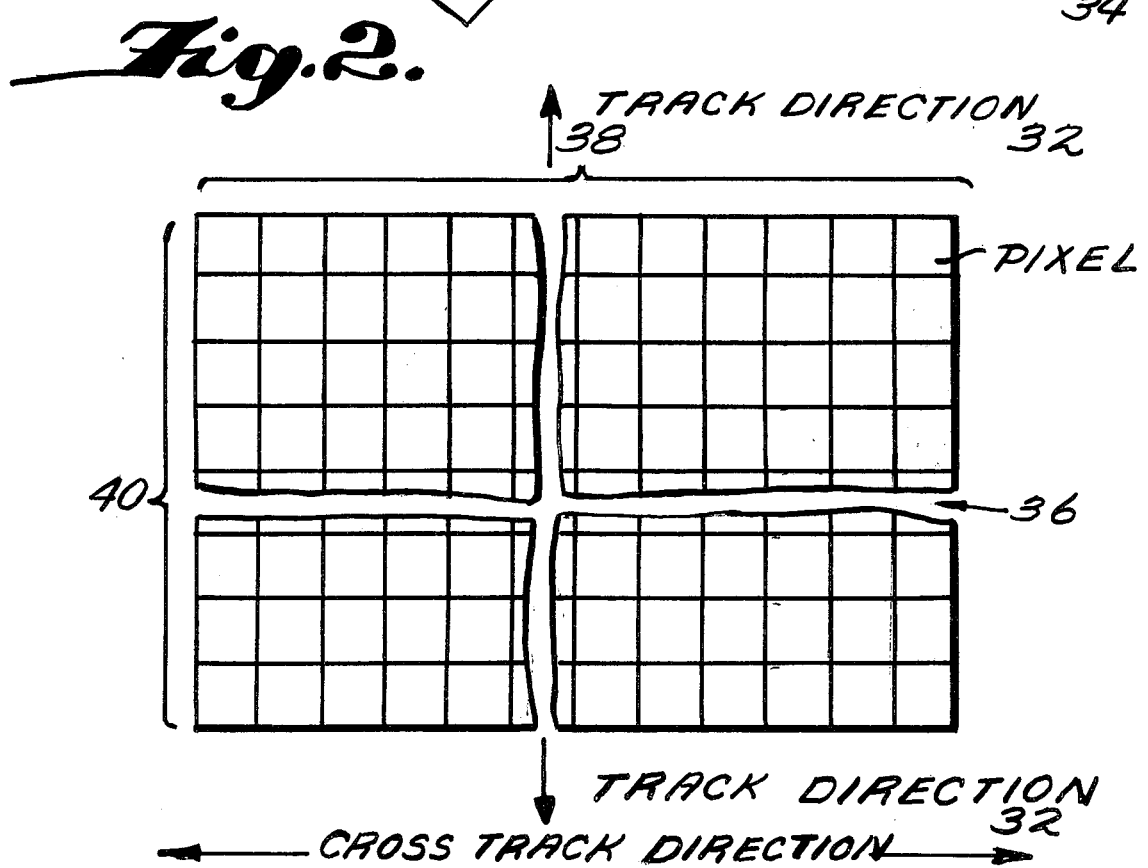
FIG. 2 is a pictorial representation of an array of CCDs positioned at the final image surface of the spectroradiometer.

Referring now to FIG. 2 there is shown a pictorial representation of an array 36 of CCDs positioned at the final image surface of the spectroradiometer. The axis of CCD array 36 along its length 38 corresponds to the essentially one-dimensional spatial coordinate running along length 28 of the field of view defined by the narrow strip field mirror. The spectrograph dispersion occurs in the second of the two orthogonal dimensions of the CCD array (width 40), so that this second dimension corresponds to a spectral coordinate. Conventional electronic readout techniques are then to be used to read and interpret the CCD array output. In this manner, spectral data is recovered for points along an entire narrow field of view, i.e., simultaneously for all points in a single line of the two-dimensional region being remotely observed.

As one specific example of the size of CCD array 36, assume that 20 micrometer square pixels (individual elements of the array) are used. CCD array 36 has 64 pixels in the track (flight) direction 32. Cross-track array size must be as large as necessary to cover the field. Utilizing standard optical equations, the final image length and hence the length of the CCD array is determined by the focal length and field of view. For an 18° field of view, and a 250 mm focal length the length 38 of CCD array 36 would include 3960 pixels. At this scale, each pixel represents an 80 microradian instantaneous field of view.

Figure 4:
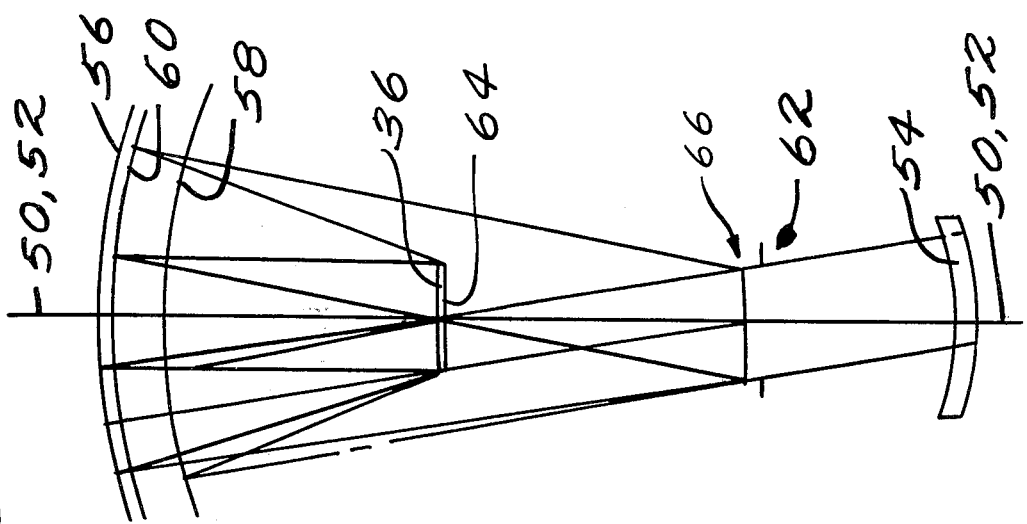
FIG. 4 is an optical ray path view along the track axis of the strip-field spectroradiometer according to the present invention.
Figure 3:
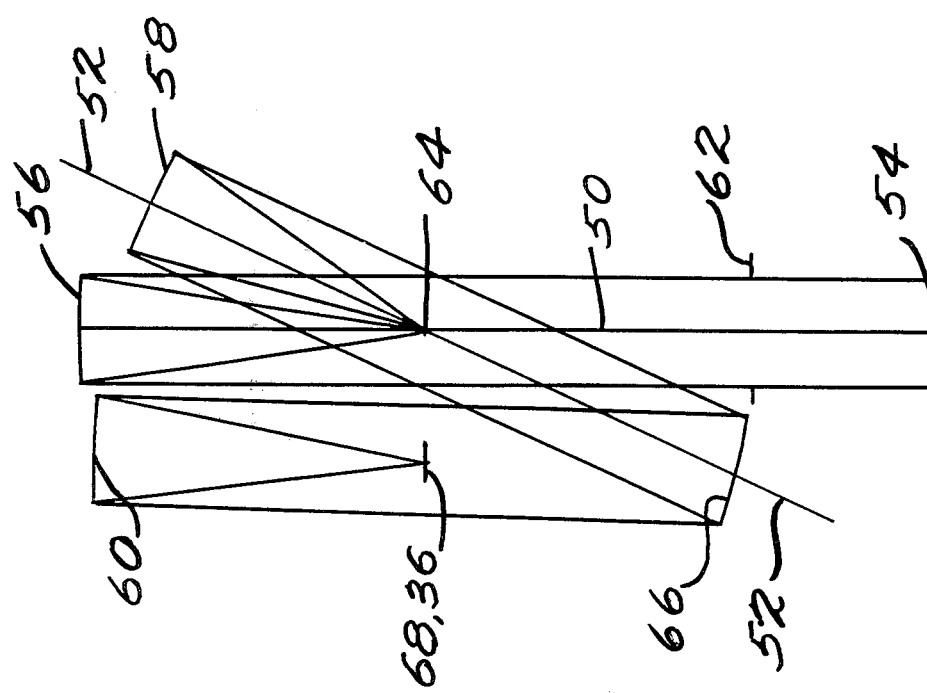
FIG. 3 is an optical ray path view along the cross-track axis of the strip-field spectroradiometer according to the present invention.

Referring now to FIGS. 3 and 4, there are shown optical ray path views along the track and cross-track axes, respectively, of the strip-field spectroradiometer, according to the present invention.

The strip-field spectroradiometer, according to the present invention, includes a concentric telescope having an optical axis 50 folded into the collimator axis 52 of a modified Czerny-Turner spectrograph. Light from the two-dimensional region of the earth being scanned is predistorted by the lens so as to compensate for the spherical aberration of the telescope mirror 56. Telescope corrector lens 54 cannot be used to also compensate for the spherical aberration of the spectrograph mirrors (58 and 60 discussed below) because the telescope is optically decoupled from the spectrograph by the spectrograph field mirror 64, at least in the track direction.

Light entering through telescope corrector lens 54 passes through an aperture stop 62 and is brought into focus by primary telescope mirror 56. A spherical field mirror 64 is positioned at the first optical focal surface after reflection of light by primary telescope mirror 56. This first optical focal surface is spherical and field mirror 64 also has a spherical reflector surface. Field mirror 64 is in the shape of a narrow strip so as to narrow the field of view to essentially one dimension (a line having minimum thickness) in reflecting light to a collimator mirror 58. Its spherical surface and long narrow form permit imagery to be excellent over a wide field of view. Collimated light reflected by collimator mirror 58 is dispersed by a grating 66 and then brought into focus by a camera mirror 60 to a final image surface 68. Detector array 36 is positioned at this final image surface 68.

Grating 66 is almost flat, but its surface is made with a slightly curved form to compensate for aberrations, such as spherical aberration introduced by other mirrors in the strip-field spectroradiometer.

Detector array 36 is an array of CCDs as shown in FIG. 2. CCDs are solid-state optical detectors. These CCDs incorporate readout converters for converting parallel optical signals into serial electronic form. They offer compactness, are lightweight, and require only modest power levels to operate. Furthermore, they require minimum elecronic drive and signal-processing circuitry.

Field mirror 64, in essence, folds one optical system into another. Light from the telescope optical system is folded into the spectrograph. The telescope image surface is concentric about aperture stop 62 and is hence convex as seen by light coming from telescope mirror 56. It is important that field mirror 64 be or at least approximate a spherical mirror. A flat mirror would feed collimating mirror 58 with light from a concave (as seen by collimator mirror 58) image surface. Since this concave image surface could not possibly be concentric with collimating mirror 58, the spectrograph imagery for an extended field of view would be poor. The use of a convex field mirror 64 feeds collimating mirror 58 with light coming from a convex (as seen by mirror 58) image surface, thereby permitting the use of the concentric principle in the design of the spectrograph.

Field mirror 64 is tilted to reflect the optical axis 50 of the telescope into the collimator axis 52 of the spectrograph. This tilt produces some axial distortion at final image surface 68. That is, a straight line parallel to the cross-track axis in the scene becomes a curved line in the final image surface containing detector array 36.

In the preferred embodiment, field mirror 64 is a long, narrow mirror in the form of a strip having a spherical surface. In practice, since the width of the slit is so narrow, this spherical surface can be approximated by the surface of a cylinder allowing for a more inexpensive production of field mirror 64. In the spectrograph, collimator mirror 58, camera mirror 60, and the final image surface are all concentric, or as nearly concentric as practical, with the center of grating 66 being the common center.

Therefore, in essence, there are two separate and distinct concentric optical systems. The telescope is concentric about aperture 62 and the spectrograph is concentric about grating 66. Field mirror 64 is utilized to fold the telescope optical system having optical axis 50 into the spectrograph optical system having collimator axis 52. Previous telescopic spectroradiometers have been unable to provide good image quality over a wide field of view. By utilizing spherical field mirror 64 to fold the optical path at or near the first focal surface of the telescope, both the telescope and spectrograph can approximate concentric optical systems. Concentric optical systems, with a stop at the common center of curvature do not have field-angle-dependent aberrations and are thus highly advantageous in the strip-field spectroradiometer according to the present invention.

The instantaneous field of view of the entire system is controlled by field mirror 64. The image at this point must be good in the track direction to permit high spatial resolution on the ground in the track direction. The spectrograph dispersion is in the track direction, so that the individual CCD elements (pixels) of detector array 36 in this direction help to determine the spectral resolution.

In the cross-track axis, the spectrograph can see through the narrow slit created by field mirror 64 because the slit is large in this direction. Hence, the spectrograph itself does not limit the instantaneous field of view in this direction. Thus, the spatial resolution in the cross-track direction is determined by the size of the individual CCD elements in detector array 36 and the image quality at the detector array.

There as been described a strip-field spectroradiometer for gathering spectral data for an entire line of a two-dimensional scene simultaneously, thereby eliminating much of the mechanical complexity of apparatus used for conventional scanning of a two-dimensional scene point-by-point. The apparatus according to the present invention, by providing spectral data in real time, is an excellent alternative to conventional photographic techniques requiring processing delays.

Other embodiments and modifications of the present invention will be apparent to those of ordinary skill in the art having the benefit of the teaching presented in the foregoing description of the preferred embodiment, the drawings and the appended claims. It is therefore to be understood that this invention is not to be unduly limited and such modifications are intended to be within the scope of the appended claims.

What is claimed is:

1. A spectroradiometer comprising:
   an optically concentric telescope;
   an optically concentric spectrograph;
   a tilted, convex field mirror optically coupling said telescope to said spectrograph so as to form an image at a final image surface thereof; and
   an array of charge coupled devices positioned at the final image surface of said spectrograph for detecting the image formed thereat.

2. A spectroradiometer according to claim 1, wherein said telescope includes an aperture stop and is optically concentric about said aperture stop.

3. A spectroradiometer according to claims 1 or 2, wherein said field mirror is spherical.

4. A spectroradiometer according to claims 1 or 2, wherein said field mirror is in the form of a narrow strip.

5. A spectroradiometer according to claim 1, wherein said spectrograph further includes a grating for dispersing light reflected into the spectrograph by the field mirror.

6. A spectroradiometer according to claim 5, wherein said spectrograph is optically concentric about said grating.

7. A spectroradiometer for gathering two-dimensional spectral scene information comprising:
   an optically concentric telescope for receiving radiation from said two-dimensional scene;
   a collimator mirror for collimating radiation received through said telescope;
   a tilted, convex field mirror for coupling light received through said telescope to said collimator mirror;
   a grating system for receiving and diffracting collimated radiation from said collimating mirror;
   a camera mirror for focusing light diffracted by said grating; and
   a detector array for receiving light focused by said camera mirror and for detecting the spectral components of radiation received therefrom thereby detecting the spectral components of the radiation received through said telescope said field mirror, grating system, camera mirror and detector array forming an optically concentric spectrograph.

8. A spectroradiometer according to claim 7, wherein said telescope comprises:
   a telescope corrector lens;
   an aperture stop; and
   a telescope mirror.

9. A spectroradiometer according to claim 8, wherein said telescope mirror reflects radiation into an image surface that is concentric about said aperture, thereby appearing convex as seen by light reflected from said telescope mirror.

10. A spectroradiometer according to any of claims 7-9, wherein said field mirror is spherical.

11. A spectroradiometer according to any of claims 7-9, wherein said field mirror is convex.

12. A spectroradiometer according to any of claims 7-9, wherein said field mirror is tilted so as to reflect light from the optical axis of said telescope into the optical axis of said collimator.

13. A spectroradiometer according to claim 7, wherein said spectrograph includes an array of charge coupled devices as a detector in its final image plane.

14. A spectroradiometer comprising:
   an optically concentric telescope having a first telescope optical axis and a telescope mirror;
   a collimator mirror for collimating light received through said telescope and having a collimator optical axis, said first telescope axis and said collimator optical axis intersecting at a point;
   a tilted, convex field mirror located at said point of intersection of the optical axes of said telescope and said collimator mirror said field mirror for optically coupling light from said telescope mirror to said collimator mirror;
   a grating intersecting said collimator optical axis for receiving light from said collimating mirror;
   a camera mirror for reflecting light coming from said grating; and
   a detector array for receiving light reflected from said camera mirror.

15. A spectroradiometer according to claim 14, wherein said collimating mirror and said camera mirror are optically concentric about said grating.

16. A spectroradiometer according to claim 14, wherein said detector array includes an array of charge coupled devices.

17. A spectroradiometer comprising:
   a telescope for receiving incident light and having a first optical axis;
   a spectrograph having a second optical axis;
   a tilted, convex field mirror for reflecting light from said telescope along said first optical axis into said spectrograph along said second optical axis, said telescope and said spectrograph each having a concentric optical system.

18. A spectroradiometer according to claim 17, wherein said spectrograph includes an array of charge coupled devices positioned at its final image plane.

19. A spectroradiometer according to claim 18, wherein said field mirror is spherical.

20. A spectroradiometer according to claim 18, wherein said field mirror is convex.

21. A spectroradiometer comprising:
   an optically concentric telescope having a first optical axis;
   an optically concentric spectrograph having a second optical axis; and
   a tilted, convex field mirror for reflecting light from said first optical axis into said second optical axis.

22. A spectroradiometer comprising:
   an optically concentric telescope;
   an optically concentric spectrograph;
   a tilted, convex field mirror optically coupling said telescope to said spectrograph;
   a grating which corrects sperical aberrations of said spectrograph; and
   an array of charge coupled devices positioned at the final image surface of said spectrograph.

23. A spectroradiometer according to claim 22 wherein said telescope includes an aperture stop and is optically concentric about said aperture stop.

24. A spectroradiometer according to either of claims 22 or 23 wherein said field mirror is in the form of a narrow strip.

25. A spectroradiometer according to claim 24 wherein said field mirror is spherical.

26. A spectroradiometer for gathering two-dimensional spectral scene information comprising:
  an optically concentric telescope for receiving radiation from said two-dimensional scene;
  a collimator mirror for collimating radiation received through said telescope;
  a tilted, convex field mirror for coupling light received through said telescope to said collimator mirror;
  a grating system for receiving and transmitting collimated radiation from said collimating mirror and for correcting aberrations within the spectroradiometer;
  a camera mirror for focusing light transitted by said grating; and
  a detector array for receiving light focused by said camera mirror and for detecting the spatial components of radiation received therefrom thereby detecting the spectral components of the radiation received through said telescope.

* * * * *